(12) United States Patent
Gatti

(10) Patent No.: US 6,246,208 B1
(45) Date of Patent: Jun. 12, 2001

(54) METHOD OF FEEDING ASYNCHRONOUS MOTORS WITH AN INVERTER, IN PARTICULAR FOR BATTERY-POWERED VEHICLES

(75) Inventor: Federico Gatti, Casalmaggiore (IT)

(73) Assignee: Zapi S.p.A., Poviglio (IT)

( * ) Notice: Subject to any disclaimer, the term of this patent is extended or adjusted under 35 U.S.C. 154(b) by 0 days.

(21) Appl. No.: 09/441,467

(22) Filed: Nov. 17, 1999

(30) Foreign Application Priority Data

Nov. 20, 1998 (IT) .............................. PR98A0066

(51) Int. Cl.[7] ...................................... H02P 5/28
(52) U.S. Cl. ............................... 318/801; 318/619
(58) Field of Search .......................... 318/609, 801, 318/803, 811, 685, 696, 727

(56) References Cited

U.S. PATENT DOCUMENTS

| | | | |
|---|---|---|---|
| 4,199,711 | * 4/1980 | Horiuchi et al. ................... | 318/139 |
| 4,388,577 | * 6/1983 | Blaschke et al. ................... | 318/717 |
| 4,467,256 | * 8/1984 | Antognini et al. .................. | 318/696 |
| 5,016,157 | * 5/1991 | Rozman et al. ..................... | 363/39 |
| 5,290,205 | * 3/1994 | Densmore et al. ................... | 482/54 |
| 5,581,168 | * 12/1996 | Rozman et al. ..................... | 318/723 |
| 5,747,963 | * 5/1998 | Visinka ............................ | 318/717 |
| 5,751,128 | * 5/1998 | Chalupa et al. .................... | 318/439 |
| 5,994,867 | * 11/1999 | Birk et al. ....................... | 318/717 |

* cited by examiner

*Primary Examiner*—Robert E. Nappi
*Assistant Examiner*—Rina I. Duda
(74) *Attorney, Agent, or Firm*—Pillsbury Winthrop LLP

(57) ABSTRACT

The present invention relates to a method of feeding asynchronous motors with an inverter, of the type comprising a driver of the inverter and feedback of the voltages at the terminals of the asynchronous motor. The abovementioned method measures the duty cycle of the voltages at the terminals, compares it with reference values, calculating the errors between actual duty cycle and ideal duty cycle, in order to obtain, by means of further application of a PI control algorithm, compensation of the driver, eliminating the distortions introduced by the inverter itself.

4 Claims, 2 Drawing Sheets

METHOD OF FEEDING ASYNCHRONOUS MOTORS WITH AN INVERTER, IN PARTICULAR FOR BATTERY-POWERED VEHICLES

BACKGROUND OF THE INVENTION

The present invention relates to a method of feeding asynchronous motors with an inverter, in particular for battery-powered vehicles.

The technique of driving the three-phase bridge forming the inverter is independent of the type of electronic power component used and consists in the generation of a sinusoidal waveform or other type of waveform by means of the known PWM (Pulse Width Modulation) technique.

In the known feeding methods, the three-phase bridge introduces distortions into the voltage at the terminals which are reflected in a distortion of the current.

These distortions are due to the nature of operation of the inverter in which the two switches (electronic switch) belonging to the same bridge means must be driven in a complementary manner so as to prevent them from conducting together with consequent possible damage of the inverter.

The causes of the abovementioned distortions are to be found in the switching-on and switching-off times of the switches which are not ideal, with a consequent difference between the instant of actual commutation of the connection terminal of the motor and instant of commutation of the driving PWM. In addition to this, the commutation times vary depending on the load, thus resulting in a sinusoid which is not only different from that which is desired, but is also distorted.

A further cause of distortion arises from the need to introduce a dead time between switching-off of one switch and switching-on of the other one since, on account of the already mentioned commutation times, the two switches could in fact conduct together.

Although the dead time introduced in the PWM is known, the effective dead time cannot be defined with precision and is variable with the load conditions of the bridge on account of the presence of the delays in switching on and switching off. During the dead time periods, conduction of the current occurs via the recirculating diodes, so that the voltage at the terminal, during these periods, is defined by the sign of the current. The result is that the dead time adds to or subtracts from the voltage on the terminal a value depending on the sign of the current. With each change in the sign of the current, namely at each halfwave of the sinusoid, a step is generated in the voltage applied to the phases.

The abovementioned distortion affects operation of the motor, in particular at low voltages, or at low frequency, with a consequent distortion of the current and increase in the losses in the motor. Moreover, a distortion is produced in the rotating field and hence in the torque, which causes vibrations of the motor and the machine both at low speed and during the start-up or stopping phases.

Methods which are designed to reduce or eliminate the distortion effects described above are known.

One of the most widespread methods involves feedback of the filtered phase voltage and adjustment of the PWM with reconstruction of the sinusoid in the phases. On the basis of the feedback of the variables at the last stage in the chain, excellent results may be obtained, but the system is very complicated, and hence costly, in terms of both hardware and software. In particular, the electronic transduction device (filters and amplifiers), in addition to being complicated, causes delays and lack of homogeneity between the various parameters fed back due to the tolerances of the components; the adjustment of the control parameters is complex and it is difficult to find the right balance between speed of compensation and stability of the system. Also, in the case where a microcontroller is used, the control algorithm is complex and laborious and the microcontroller itself tends to be overloaded and it is often necessary to adopt a more powerful microcontroller with an consequent increase in costs.

Other known compensation techniques are able to read the sign of the current and, with an change in the sign, subtract from or add to the predefined amplitude of the sinusoid a value corresponding to the dead time.

This technique is very economical, but the results are not as good because, on account of the distortions, it is difficult to know the exact instant of inversion of the sign and also because the compensation value to be introduced is not defined.

SUMMARY OF THE INVENTION

The object of the present invention is that of eliminating the abovementioned drawbacks and providing a method of feeding asynchronous motors with inverter which eliminates the distortions in the inverter itself in an economical, simple and effective manner.

Said objects are fully achieved by the method of feeding asynchronous motors with inverter, in particular for battery-powered vehicles according to the present invention, as described by the contents of the claims indicated below.

In particular, in addition to the step of feedback of the voltages at the terminals, the abovementioned method comprises the steps of measurement of the duty cycle (relationship between conduction time and period of the PWM) of the abovementioned voltages, comparison with a reference value and compensation.

BRIEF DESCRIPTION OF THE DRAWINGS

These and other characteristic features will emerge more clearly from the following description of a preferred embodiment illustrated, purely by way of a non-limiting example, in the accompanying plates of drawings, in which.

DESCRIPTION OF THE PREFERRED EMBODIMENTS

Figure 1:
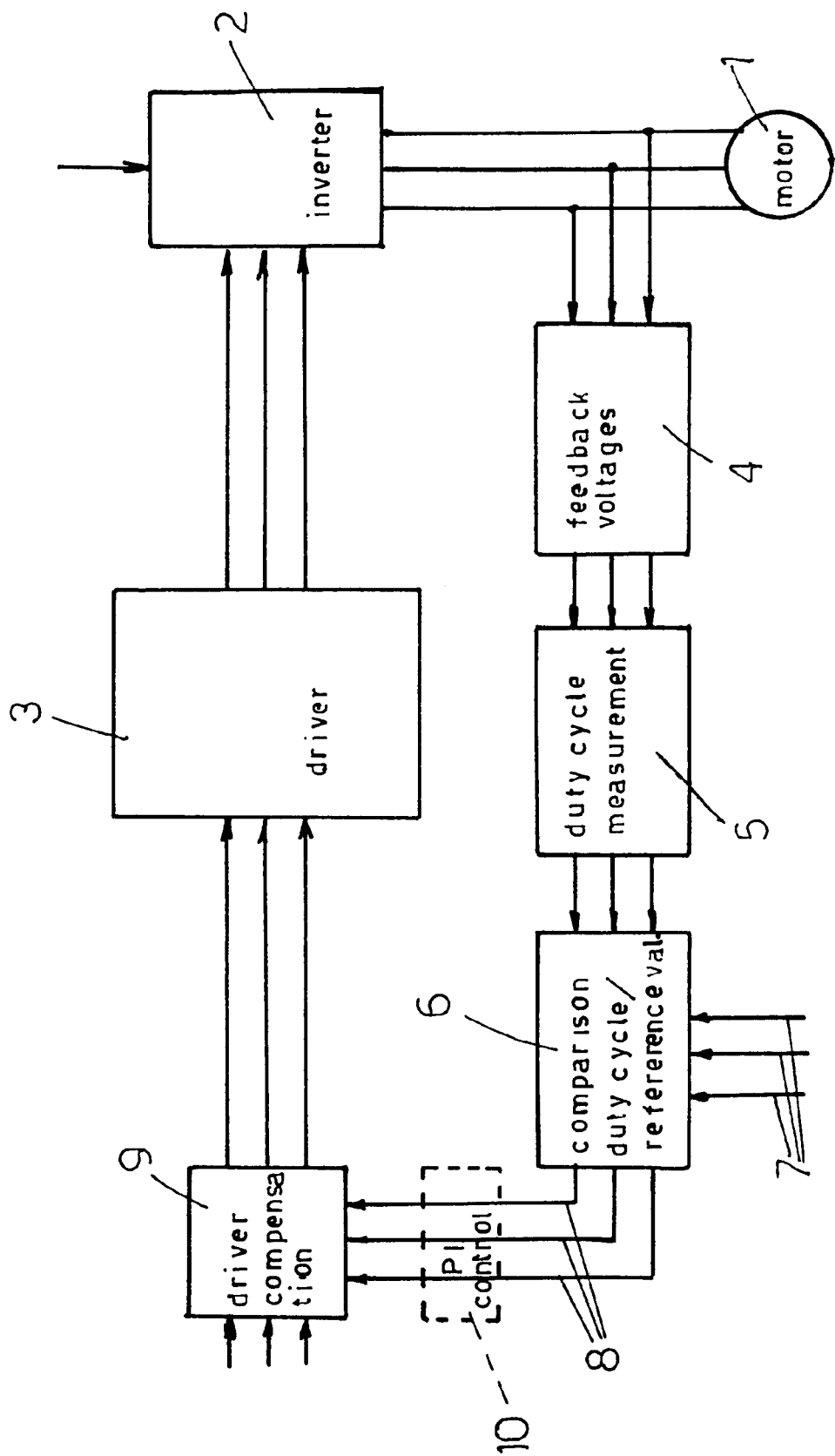
FIG. 1 shows a block diagram of the feeding method.

With reference to the FIG. 1 denotes an asynchronous motor fed, via an inverter 2 and a driver 3 of the inverter itself, by a continuous line voltage derived either from rectification of an alternating mains voltage or from an effective source of direct voltage such as a battery of an electric vehicle.

In accordance with that shown in FIG. 1, feeding of the motor 1 is performed by means of a method comprising a feedback step 4 designed to draw the voltages from the terminals, and reduce them to the input level of the subsequent steps which in an original manner comprise a step 5 involving measurement of the duty cycle (relationship between conduction time and period of the PWM) of the abovementioned voltages, a step 6 involving comparison of the duty cycle with reference values 7 and calculation of the error 8, the application 10, if required, of a PI (proportional-plus-integral) control algorithm and finally a step 9 involving compensation of the driving PWM.

This method operates by compensating the essential effect of the commutation delays and dead times, which consists in a different duty cycle of the squarewave at the terminal compared to that of the driving PWM and from where the distortion of the sinusoid is derived. Knowing the value of the duty cycle produced at the terminals it is possible to determine the duration of the effective dead time and, consequently, compensate the PWM immediately and with extreme simplicity.

Figure 2:
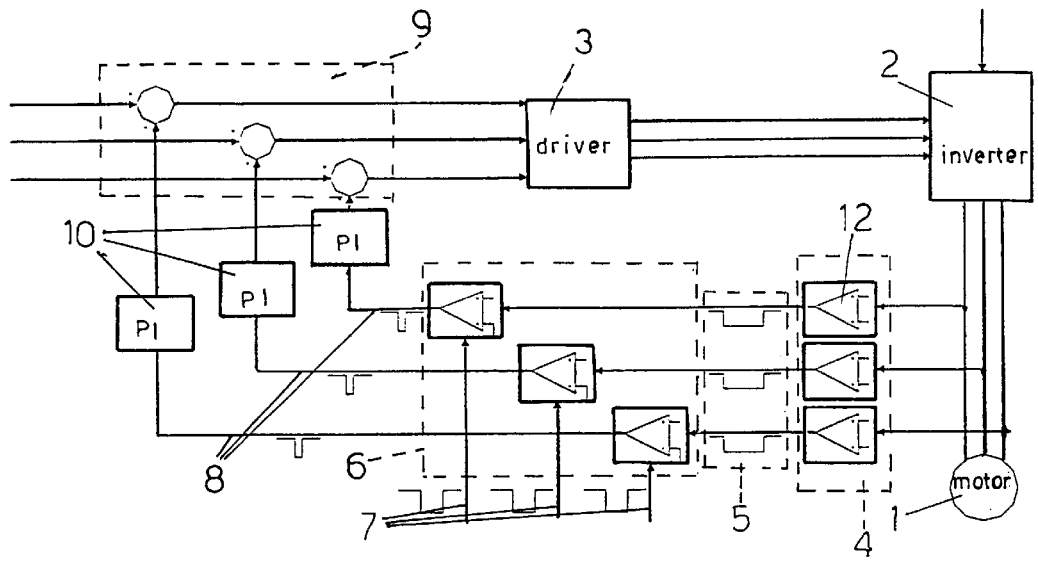
FIG. 2 illustrates a possible mode of implementation of the method according to FIG. 1.

The method described above may be easily implemented using hardware of the standard type both as feedback hardware and as microcontroller. In FIG. 2 the feedback hardware comprises three comparators 12 which draw the voltages from the terminals in order to feed the next comparison stage 6 which performs the comparison with the ideal square wave 7 and calculation of the error 8, with application 10, if necessary, of the PI control algoritm and algebraic sum 9 to the driving PWM.

Figure 3:
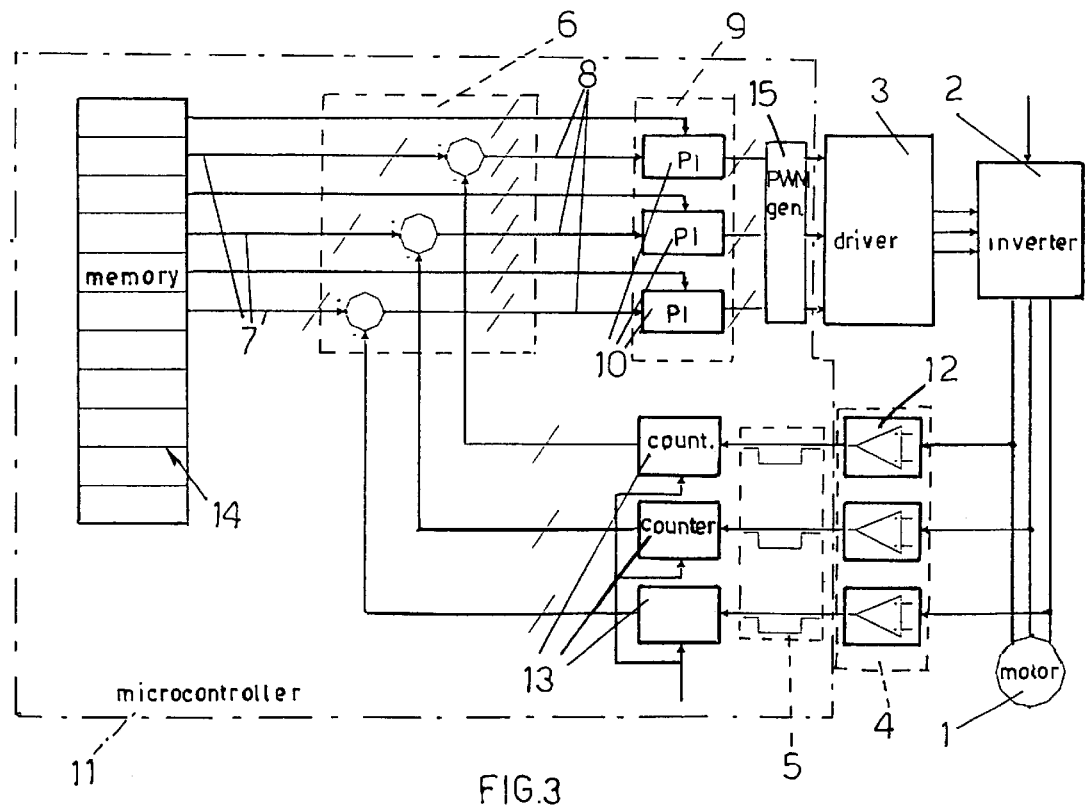
FIG. 3 illustrates a possible digital mode of implementation of the method according to FIG. 1.

FIG. 3 shows a possible digital mode of implementation, where the three comparators 12 and a microcontroller 11 are present; moreover, the feedback path inside the microcontroller 11 comprises a plurality of counters 13. The comparators 12 draw the voltages from the terminals of the motor and reduce them to the input level of the microcontroller 11.

The microcontroller 11 performs the steps described above namely: measurement of the duty cycle of the fedback voltages by means of the group 13 of counters; comparison 6 of the actual duty cycle with ideal values 7 if necessary stored in a memory 14; application 10 of the PI control algorithmn for compensation 9 of the driving PWM and generation 15 of the PWM with which the driver 3 of the inverter is fed.

The ideal values 7 for the comparison step 6 are contained in the memory 14 in a table of the sinusoid; from the comparison the value of the error 8 is obtained, being introduced subsequently into the PI controller.

The comparison may be performed both using a sinusoidal reference wave, as described above, and using other reference waveforms.

The method described above offers considerable advantages compared to the two known methods; firstly, it achieves results which are markedly better than those of the compensation techniques which are able to read the sign of the current and, with a change in the sign, subtract from or add to the predefined amplitude of the sinusoid a value corresponding to the dead time. Moreover, using standard hardware and therefore with greater cost-effectiveness, it achieves results which are comparable to those of the method which envisages feedback of the filtered phase voltage and adjustment of the PWM with reconstruction of the sinusoid in the phases.

Morever, determination of the correction required is practically instantaneous and, consequently, produces a practically algebraic dynamic control loop which increases the immediacy and reduces the significance of the dynamic correction algorithm with elimination of the instability-related problems.

In the case where the method described above is performed by means of a software control algorithm, the latter is extremely simple, fast and does not result in particular overloading of the microcontroller.

Compared to the conventional feedback compensation methods, it offers a considerable advantage also with regard to the hardware of the transduction device; these errors and the distortions of this device are confined within the difference between the rise and fall times of a same squaring comparator device; the result is that by means of the simple choice of comparators belonging to the same chip it is possible to have identical delays for all the comparators between the fall time and rise time. It can be easily ascertained that the distortion due to a relative delay which is the same for all the squaring devices does not have any effect on the efficiency of the compensating action.

What is claimed:

1. A method of feeding an asynchronous motor with an inverter comprising:

measuring a duty cycle of voltages at terminals of the asynchronous motor;

comparing the actual duty cycle with reference values of an ideal duty cycle and calculating errors between the actual duty cycle and the ideal duty cycle;

applying a PI control algorithm to the calculated errors;

compensating a driver of an inverter coupled to the asynchronous motor based on the PI control algorithm to eliminate distortions in the voltages at the terminals introduced by the inverter itself.

2. The method of claim 1, wherein comparing is performed with reference to a sinusoidal reference value.

3. The method of claim 2, wherein the sinusoidal reference value is extracted from a memory of a microcontroller.

4. The method of claim 1, wherein comparing is performed with reference to a reference value having any waveform.

* * * * *